US012722794B1

(12) United States Patent
Hunter et al.

(10) Patent No.: US 12,722,794 B1
(45) Date of Patent: Sep. 1, 2026

(54) TURBOFAN THERMOELECTRIC GENERATION

(71) Applicant: RTX Corporation, Farmington, CT (US)

(72) Inventors: Ryan William Hunter, North Palm Beach, FL (US); Brady M. Wilson, Westerville, OH (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 19/356,722

(22) Filed: Oct. 13, 2025

(51) Int. Cl.

| | |
|---|---|
| ***B64D 33/08*** | (2006.01) |
| ***B64D 27/10*** | (2006.01) |
| ***F02C 6/14*** | (2006.01) |
| ***F02C 7/14*** | (2006.01) |
| ***H02N 11/00*** | (2006.01) |

(52) U.S. Cl.
CPC ............ *B64D 33/08* (2013.01); *B64D 27/10* (2013.01); *F02C 6/14* (2013.01); *F02C 7/14* (2013.01); *H02N 11/002* (2013.01); *F05D 2260/213* (2013.01)

(58) Field of Classification Search
CPC . B64D 33/08; B64D 27/10; F02C 6/14; F02C 7/14; H02N 11/002; F05D 2260/213
See application file for complete search history.

(56) References Cited

U.S. PATENT DOCUMENTS

| | | | |
|---|---|---|---|
| 9,018,512 B2 | 4/2015 | Kwok et al. | |
| 9,388,740 B2 | 7/2016 | Kwok et al. | |
| 10,533,481 B2 | 1/2020 | Peck, Jr. et al. | |
| 10,711,693 B2 | 7/2020 | Miller et al. | |
| 2016/0123185 A1 | 5/2016 | Le Pache et al. | |
| 2017/0145892 A1* | 5/2017 | Peck, Jr. | F04D 29/522 |
| 2020/0309011 A1* | 10/2020 | Armatorio | H02S 20/30 |
| 2024/0141800 A1 | 5/2024 | K et al. | |
| 2025/0198302 A1* | 6/2025 | Rivers | F01D 25/12 |
| 2025/0277469 A1* | 9/2025 | Al-Khairy | B64D 33/08 |
| 2025/0289575 A1* | 9/2025 | Wang | B64D 27/33 |

* cited by examiner

*Primary Examiner* — Phutthiwat Wongwian
*Assistant Examiner* — Roberto Toshiharu Igue
(74) *Attorney, Agent, or Firm* — Bachman & LaPointe, P.C.

(57) ABSTRACT

A gas turbine engine has: a core flowpath sequentially through one or more fan sections, one or more compressor sections, a combustor section, and one or more turbine sections; a bypass flowpath extending through the one or more fan sections and bypassing the combustion section; a heat exchanger in the bypass flowpath placing a portion of the bypass flowpath in heat exchange relation with a second fluid flowpath; a first thermoelectric generator having a first side upstream of the heat exchanger along the bypass flowpath and a second side away from the bypass flowpath; and a second thermoelectric generator having a first side downstream of the heat exchanger along the bypass flowpath and a second side away from the bypass flowpath.

19 Claims, 6 Drawing Sheets

TURBOFAN THERMOELECTRIC GENERATION

BACKGROUND

The disclosure relates to gas turbine engines. More particularly, the disclosure relates to bypass heat exchangers in turbofan engines.

Turbofan engines allow a portion of the airflow passing through one or more fan stages to bypass downstream core compressor stages and combustion in the combustor. For typical high bypass turbofan engines, this bypass flow exits the engine without joining the core flow (gaspath) within the engine. For certain low bypass turbofan engines, the bypass flowpath may rejoin the core flowpath within the engine such as for outlet nozzle cooling.

Often, a heat exchanger will be located within the bypass flowpath to allow a portion of the bypass airflow to cool a second fluid flow along a second fluid flowpath. Examples of the second fluid flow include compressor bleed air (e.g., for cabin environment), lubrication oil (e.g., for bearing cooling or gearbox cooling), fuel (e.g., for use as a heat transfer fluid to, in turn, cool lubrication oil), and/or a heat transfer fluid (e.g., a glycol-based fluid for cooling electronics and flowing in a recirculating heat transfer fluid flowpath).

In some aircraft, an aircraft power and thermal management system (PTMS) integrates control of many electrical generation, thermal management, and pneumatics/pressurization hardware. Electrical power sources may include: one or more engine-mounted integrated drive generators (IDG); an auxiliary power unit (APU); an emergency power unit (EPU) such as an integrated power pack (IPP) or a hydrazine-powered turbine generator; a ram air turbine (RAT); and/or storage batteries.

SUMMARY

One aspect of the disclosure involves a gas turbine engine comprising: a core flowpath sequentially through one or more fan sections, one or more compressor sections, a combustor section, and one or more turbine sections; a bypass flowpath extending through the one or more fan sections and bypassing the combustor section; a heat exchanger in the bypass flowpath placing a portion of the bypass flowpath in heat exchange relation with a second fluid flowpath; at least one first thermoelectric device having a first side upstream of the heat exchanger along the bypass flowpath and a second side away from the bypass flowpath; and at least one second thermoelectric device having a first side downstream of the heat exchanger along the bypass flowpath and a second side away from the bypass flowpath.

In a further example of any of the foregoing, additionally and/or alternatively, fluid flowpath is a compressor bleed.

In a further example of any of the foregoing, additionally and/or alternatively: the second fluid flowpath comprises one or more of: a fuel flowpath fuel; a lubricant flowpath; and a glycol-based coolant flowpath.

In a further example of any of the foregoing, additionally and/or alternatively: the at least one first thermoelectric device is a plurality of first thermoelectric devices connected to form a first thermoelectric generator (TEG); the at least one second thermoelectric device is a plurality of second thermoelectric devices connected to form a second thermoelectric generator (TEG); the first thermoelectric generator and the second thermoelectric generator each have a first side and a second side; and the gas turbine engine is in an aircraft nacelle and the first thermoelectric generator and second thermoelectric generator second sides are exposed to an external airflow along an outside of the nacelle.

In a further example of any of the foregoing, additionally and/or alternatively: the first thermoelectric generator comprises said first thermoelectric devices in a circumferential and streamwise array; and the second thermoelectric generator comprises said second thermoelectric devices in a circumferential and streamwise array.

A further aspect of the disclosure involves an aircraft including the gas turbine engine and further comprising a storage battery.

In a further example of any of the foregoing, additionally and/or alternatively, the at least one first thermoelectric device and the at least one second thermoelectric device are coupled to the battery to allow charging of the battery.

In a further example of any of the foregoing, additionally and/or alternatively, the at least one first thermoelectric device and the at least one second thermoelectric device are coupled to the battery to allow powering by the battery.

A further aspect of the disclosure involves a method for operating the aircraft. The method comprises: in a first mode, the at least one first thermoelectric device generating electricity and the at least one second thermoelectric device generating electricity; and in a second mode, the at least one first thermoelectric device actively cooling the bypass flow and the at least one second thermoelectric device generating electricity.

A further example of any of the foregoing may additionally and/or alternatively include: using one or more thermoelectric devices of the at least one first thermoelectric device and/or the at least one second thermoelectric device to measure temperature; and responsive to the temperature measurement, controlling flow along the second fluid flowpath.

In a further example of any of the foregoing, additionally and/or alternatively the gas turbine engine is a first gas turbine engine and the aircraft has a second gas turbine engine. The second gas turbine engine also has: a core flowpath sequentially through one or more fan sections, one or more compressor sections, a combustor section, and one or more turbine sections; a bypass flowpath extending through the one or more fan sections and bypassing the combustor section; a heat exchanger in the bypass flowpath placing a portion of the bypass flowpath in heat exchange relation with a second fluid flowpath; at least one first thermoelectric device having a first side upstream of the heat exchanger along the bypass flowpath and a second side away from the bypass flowpath; and at least one second thermoelectric device having a first side downstream of the heat exchanger along the bypass flowpath and a second side away from the bypass flowpath; with the first gas turbine engine in its first mode, the second gas turbine engine at least one first thermoelectric device generating electricity and the second gas turbine engine at least one second thermoelectric device generating electricity; and with the first gas turbine engine in its second mode, the second gas turbine engine at least one first thermoelectric device generating electricity and the second gas turbine engine at least one second thermoelectric device generating electricity.

In a further example of any of the foregoing, additionally and/or alternatively: the first gas turbine engine is in its first mode and the second gas turbine engine at least one first thermoelectric device generating electricity and the second gas turbine engine at least one second thermoelectric device generating electricity during a cruise phase; and the first gas turbine engine is in its second mode and the second gas turbine engine at least one first thermoelectric device generating electricity and the second gas turbine engine at least one second thermoelectric device generating electricity during a takeoff.

In a further example of any of the foregoing, additionally and/or alternatively, with the first gas turbine engine in its second mode and the second gas turbine engine at least one first thermoelectric device generating electricity and the second gas turbine engine at least one second thermoelectric device generating electricity, a bleed flow rate from the first gas turbine engine is greater than a bleed flow rate from the second gas turbine engine.

A further example of any of the foregoing may additionally and/or alternatively include, with the first gas turbine engine: using one or more of the at least first thermoelectric device and/or the at least one second thermoelectric device to measure temperature; and responsive to the temperature measurement, controlling flow along the second fluid flowpath.

A further aspect of the disclosure involves a method for using the gas turbine engine, the method comprising: using one or more of the at least first thermoelectric device and/or the at least one second thermoelectric device to measure temperature; and responsive to the temperature measurement, controlling flow along the second fluid flowpath.

A further aspect of the disclosure involves a gas turbine engine comprising: a core flowpath sequentially through one or more fan sections, one or more compressor sections, a combustor section, and one or more turbine sections; a bypass flowpath extending through the one or more fan sections and bypassing the combustor section; a heat exchanger in the bypass flowpath placing a portion of the bypass flowpath in heat exchange relation with a second fluid flowpath; a first thermoelectric generator having a first side upstream of the heat exchanger along the bypass flowpath and a second side away from the bypass flowpath; and a second thermoelectric generator having a first side downstream of the heat exchanger along the bypass flowpath and a first second side away from the bypass flowpath.

A further aspect of the disclosure involves a method for operating a gas turbine engine, the gas turbine engine comprising: a core flowpath sequentially through one or more fan sections, one or more compressor sections, a combustor section, and one or more turbine sections; a bypass flowpath extending through the one or more fan sections and bypassing the combustor section; and a heat exchanger in the bypass flowpath placing a portion of the bypass flowpath in heat exchange relation with a second fluid flowpath. The method comprises: in a first mode, thermoelectrically generating electricity upstream of the heat exchanger while thermoelectrically generating electricity downstream of the heat exchanger along the bypass flowpath; and in a second mode, thermoelectrically heating the bypass flow upstream of the heat exchanger while thermoelectrically generating electricity downstream of the heat exchanger along the bypass flowpath.

A further example of any of the foregoing may additionally and/or alternatively include: in a third mode, thermoelectrically cooling the bypass flow downstream of the heat exchanger along the bypass flowpath.

A further example of any of the foregoing may additionally and/or alternatively include: in a third mode, thermoelectrically cooling the bypass flow upstream of the heat exchanger while thermoelectrically cooling the bypass flow downstream of the heat exchanger along the bypass flowpath.

In a further example of any of the foregoing, additionally and/or alternatively, the gas turbine engine further comprises: a first thermoelectric generator having a first side upstream of the heat exchanger along the bypass flowpath and a second side away from the bypass flowpath; and a second thermoelectric generator having a first side downstream of the heat exchanger along the bypass flowpath and a second side away from the bypass flowpath.

A further aspect of the disclosure involves a gas turbine engine comprising: a core flowpath sequentially through one or more fan sections, one or more compressor sections, a combustor section, and one or more turbine sections; a bypass flowpath extending through the one or more fan sections and bypassing the combustor section; a heat exchanger in the bypass flowpath placing a portion of the bypass flowpath in heat exchange relation with a second fluid flowpath; and thermoelectric means for generating electricity in at least one mode and actively cooling the bypass flowpath in another mode.

In a further example of any of the foregoing, additionally and/or alternatively, the actively cooling the bypass flowpath in another mode comprises: increasing the heat exchanger's extraction of heat from the second fluid flowpath; and additionally actively cooling the bypass flowpath downstream of the heat exchanger.

In a further example of any of the foregoing, additionally and/or alternatively, the actively cooling the bypass flowpath in another mode comprises: increasing the heat exchanger's extraction of heat from the second fluid flowpath; and generating electricity form the bypass flowpath downstream of the heat exchanger.

The features of the examples and embodiments above may be combined in any combination unless expressly indicated otherwise or technically infeasible.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
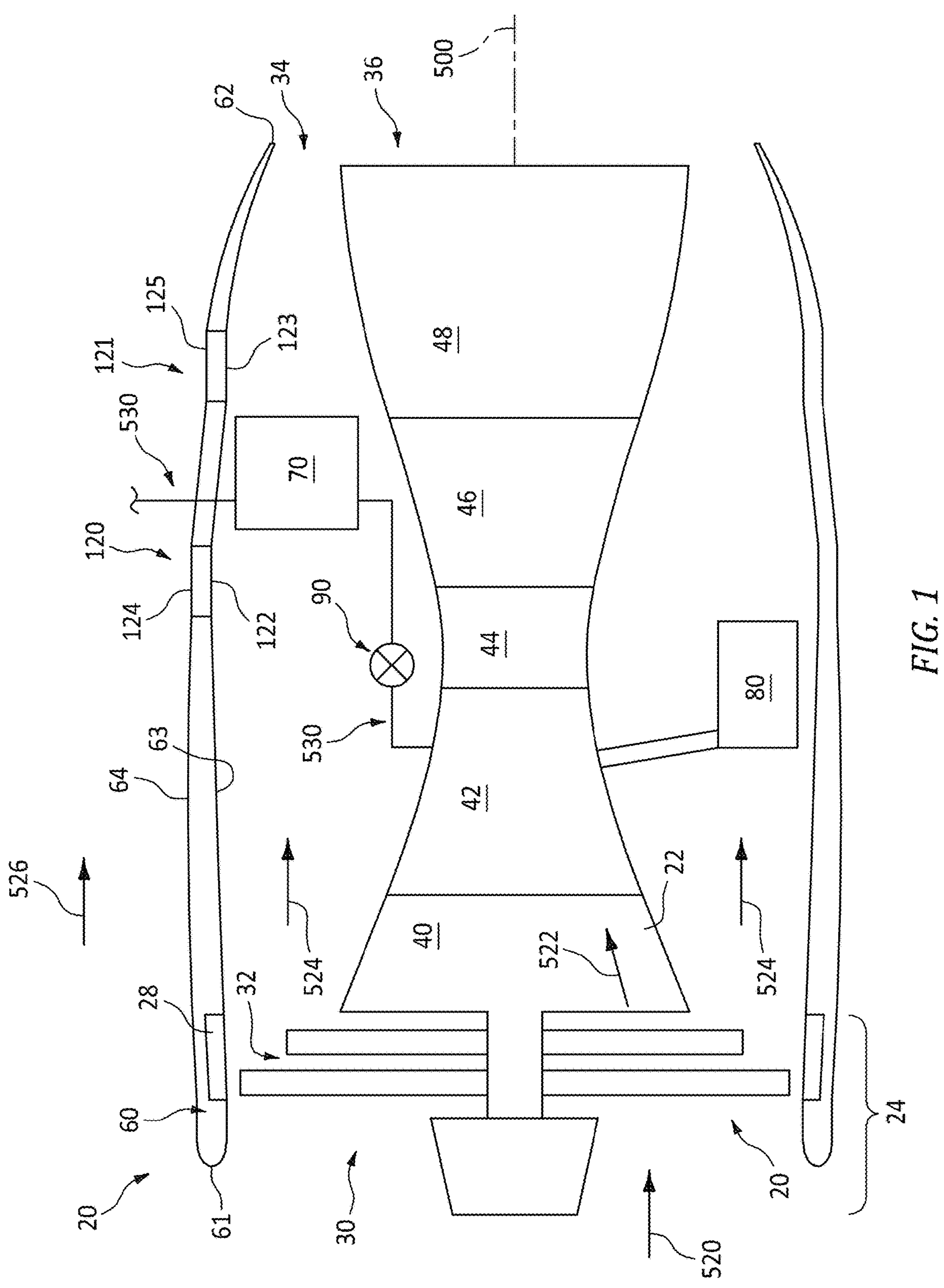
FIG. 1 is a schematic longitudinal sectional view of a gas turbine engine.

FIG. 1 shows an aircraft gas turbine engine 20 having a bypass duct heat exchanger 70. An example engine is a pylon-mounted engine in a nacelle where the pylon connects the nacelle to the aircraft fuselage such as an under-wing pylon connecting the engine indirectly to the fuselage via the wing. An example engine is one of multiple engines of the aircraft (e.g., a two-engine aircraft with one engine mounted to each wing or a four-engine aircraft with two engines mounted to each wing). In such a multi-engine aircraft, there may be symmetries or asymmetries of structure and use of the different engines. For example, even identical engines may have different functions from each other in different operational modes. Non-limiting examples of these symmetries and asymmetries are discussed below.

Figure 2:
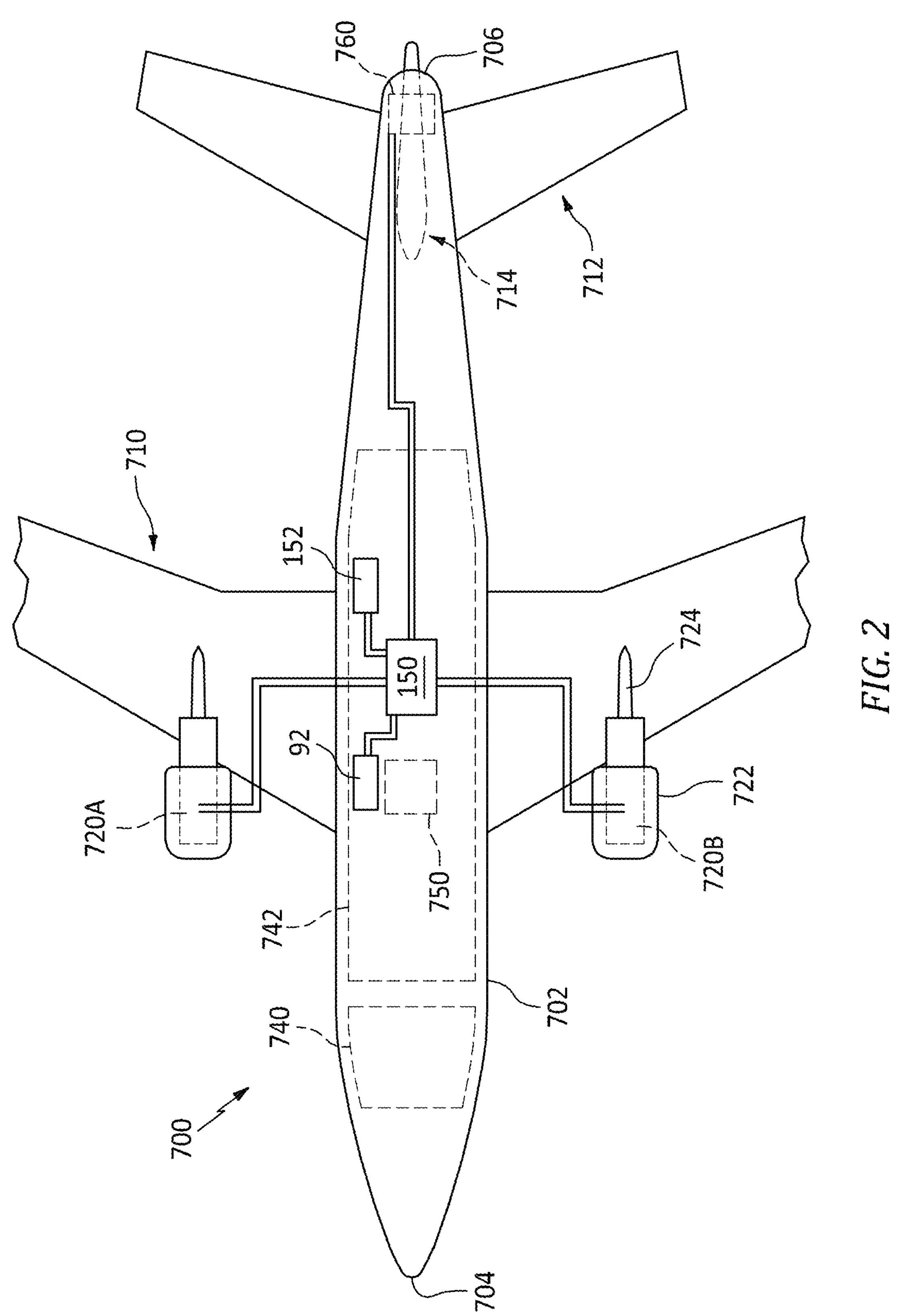
FIG. 2 is a schematic bottom view of an aircraft.

FIG. 2 schematically shows such an aircraft 700 including the engines. The example aircraft 700 has a fuselage 702. The fuselage extends from a nose 704 to a tail 706. A main wing 710 extends laterally outward from the fuselage on left and right sides. A horizontal stabilizer 712 and vertical stabilizer 714 are proximate the tail aft of the main wing. The example aircraft has engines 720A, 720B positioned in respective nacelles 722 on respective wing pylons 724. The TEGs, integral to engines 720A/B, are electrically coupled to a power conditioning unit (power management circuitry) 150 which integrates electrical input from/to the APU 760, and battery 152. A PTMS electronic controller 92 (which may be shared by the engines) is also electrically coupled to the power conditioning unit (further detail provided in FIG. 4) and is coupled to an on-engine metering valve 90.

FIG. 2 schematically shows a cockpit 740 and a passenger cabin 742. FIG. 2 also shows a fuel tank 750 and an auxiliary power unit (APU) 760. The example APU is a gas turbine engine that includes both electrical generator and air compressor functionalities. Additionally, there may be deployable ram air turbine (RAT) (not shown).

Figure 2A:
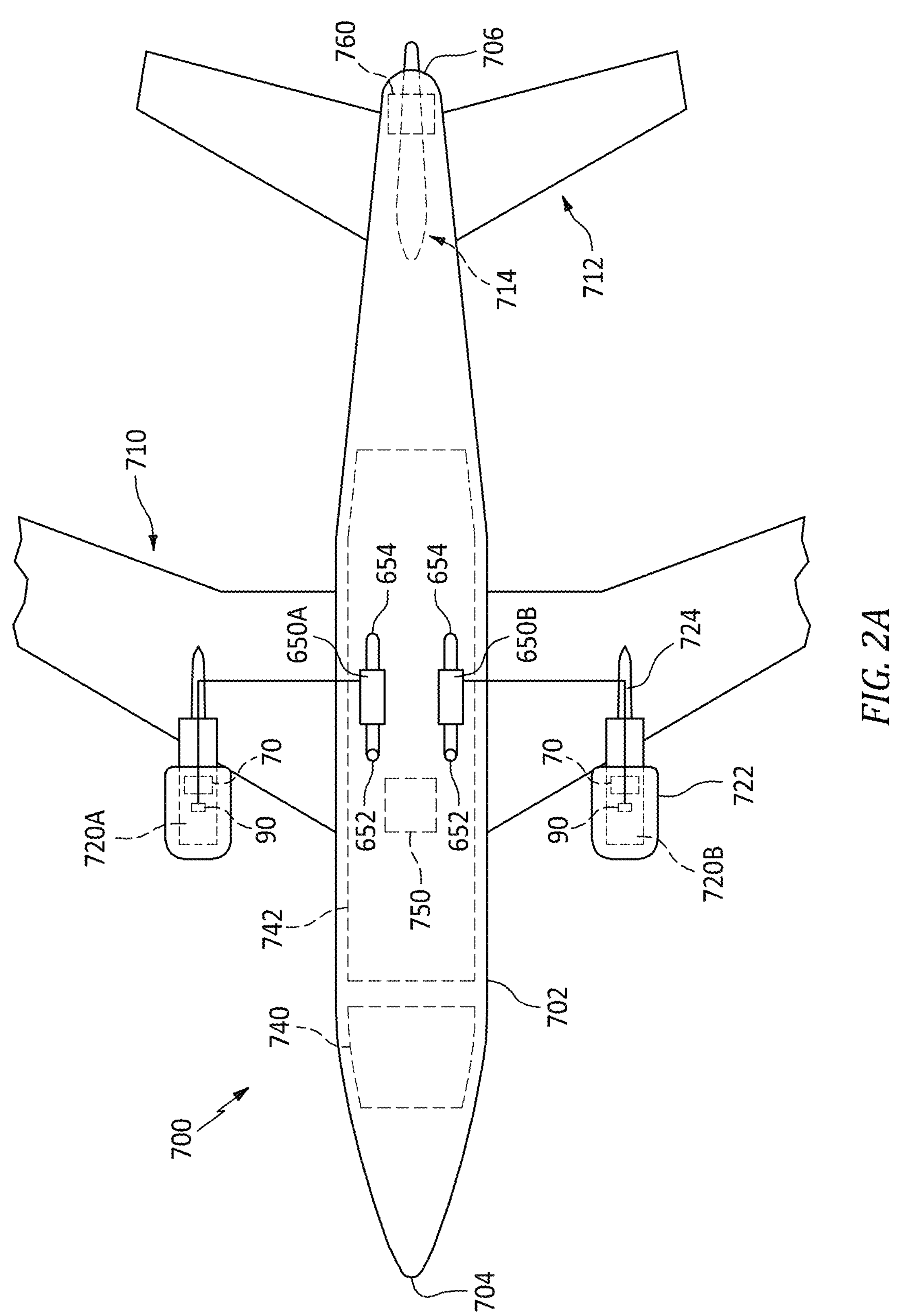
FIG. 2A is a schematic bottom view of the aircraft showing mechanical connections.
Figure 3:
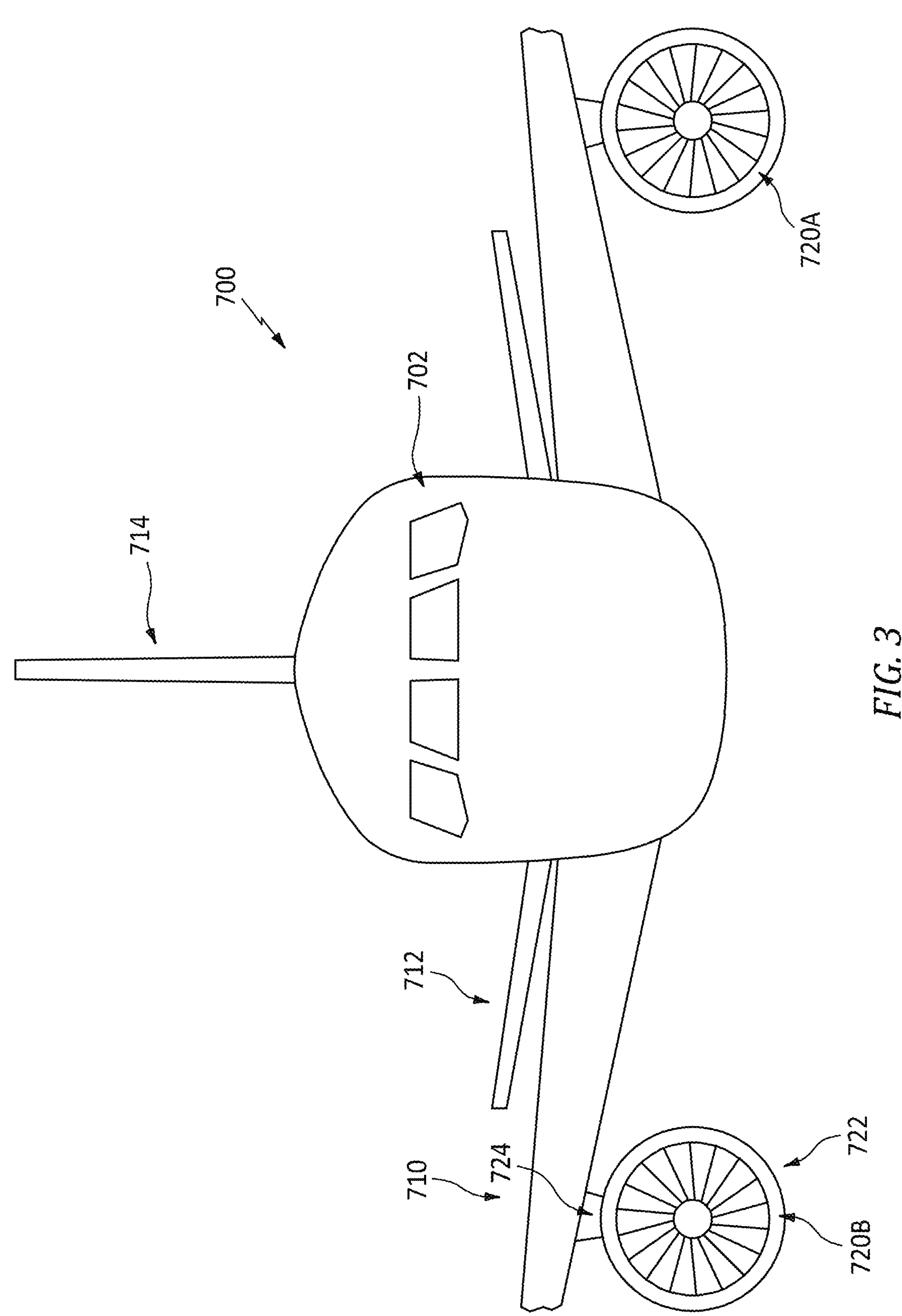
FIG. 3 is a schematic front view of the aircraft.

Control surface details (not shown) may be conventional. FIG. 2A schematically shows separate environmental control system (ECS) 650A, 650B associated with the respective engines with each having a ram air inlet 652, a ram air outlet 654, and air distribution system (not shown) to the aircraft cabin 742. The main components of each system are contained in a bay in the fuselage (e.g., including the various heat exchangers).

Other aircraft configurations exist including delta wing and delta canard configurations among other configurations lacking the traditional combination of vertical stabilizer and horizontal stabilizer (e.g., blended wing bodies).

The example aircraft has engines 20A, 20B positioned in respective nacelles 722 on respective wing pylons 724.

FIG. 1 shows an example gas turbine engine 20 (representing the engines 20A and 20B) as a two spool turbofan engine. The engine 20 has an engine case 22 surrounding a centerline or central longitudinal axis 500. An example engine has a fan section 24 including a fan 26 within a fan case 28. The example engine includes an inlet 30 at an upstream end of the fan case receiving an inlet flow along an inlet flowpath 520. The fan 26 has one or more stages 32 of fan blades. Downstream of the fan blades, the flowpath 520 splits into an inboard portion 522 being a core flowpath and passing through a core of the engine and an outboard portion 524 being a bypass flowpath exiting an outlet 34 of the bypass duct/flowpath.

The core flowpath 522 proceeds downstream to an engine outlet 36 through one or more compressor sections, a combustor, and one or more turbine sections. The example engine has two axial compressor sections and two axial turbine sections, although other configurations are equally applicable. From upstream to downstream there is a low pressure compressor section (LPC) 40, a high pressure compressor section (HPC) 42, a combustor section 44, a high pressure turbine section (HPT) 46, and a low pressure turbine section (LPT) 48. Each of the LPC, HPC, HPT, and LPT comprises one or more stages of blades which may be interspersed with one or more stages of stator vanes.

In the example engine, the blade stages of the LPC and LPT are part of a low pressure spool mounted for rotation about the axis 500. The example low pressure spool includes a shaft (low pressure shaft—not shown) which couples the blade stages of the LPT to those of the LPC and allows the LPT to drive rotation of the LPC. In an example engine, the low pressure shaft also drives the fan. In the example implementation, the fan is driven via a transmission (not shown, e.g., a fan gear drive system such as an epicyclic transmission) to allow the fan to rotate at a lower speed than the low pressure shaft.

The example engine further includes a high pressure shaft mounted for rotation about the axis 500 and coupling the blade stages of the HPT to those of the HPC to allow the HPT to drive rotation of the HPC. In the combustor 44, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

The inner diameter (ID) surface of the fan case 28 locally forms the OD boundary of the bypass flowpath 524. The fan case is mounted within an aerodynamic cowling 60 extending from a leading edge 61 to a trailing edge 62 and having an inner diameter surface 63 and an outer diameter surface 64. Thus, the cowling separates the bypass flowpath from an external flowpath 526.

Figure 4:
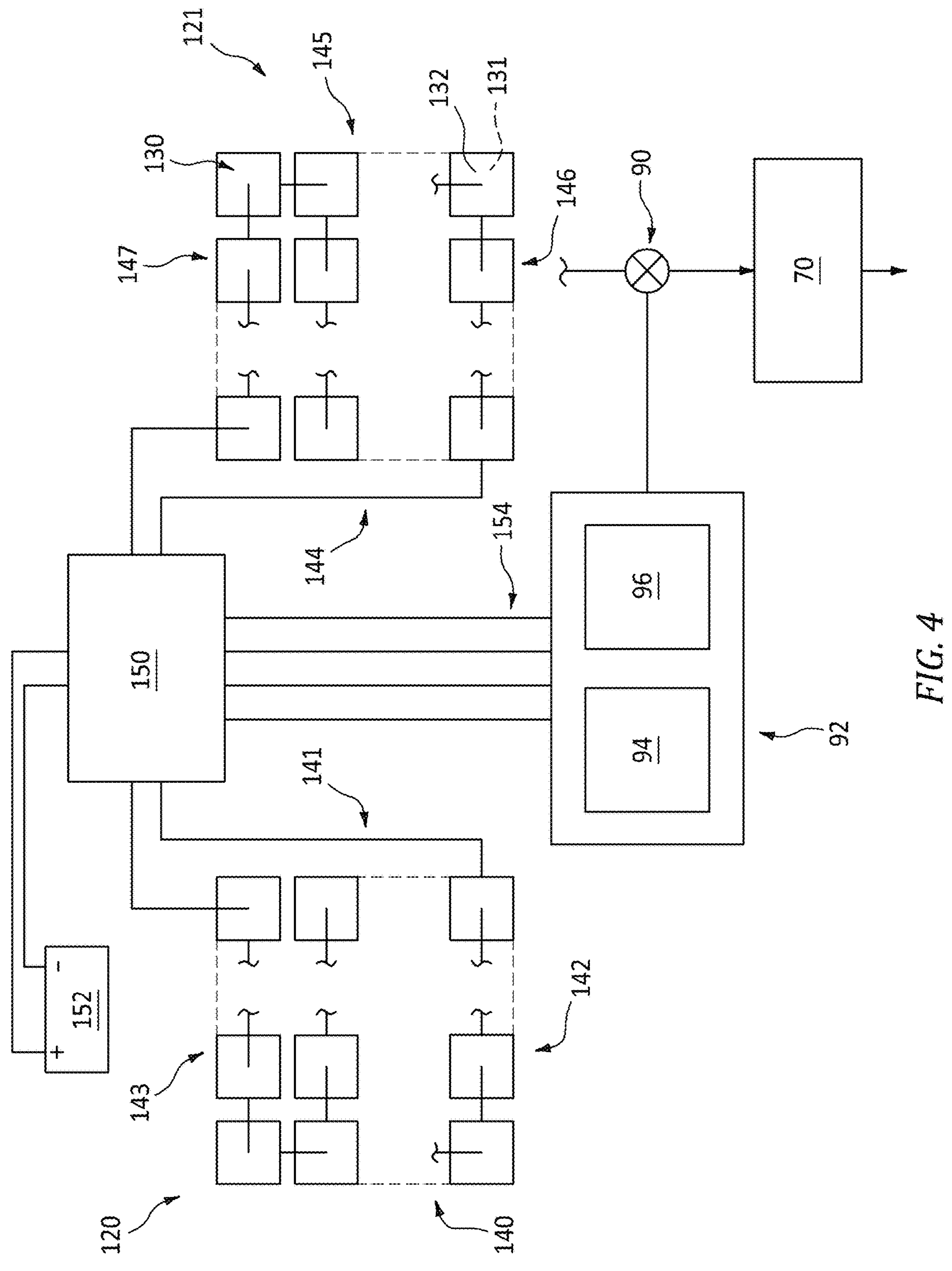
FIG. 4 is a schematic view of an electrical system.

As noted above, one or more heat exchangers 70 are positioned in the bypass duct across the bypass flowpath. In normal operation, a heat absorption flow for the heat exchanger 70 is a segment of the bypass flow. An example heat exchanger extends circumferentially for only a small sector of the bypass duct/flowpath. An example heat rejection flow is a bleed flow along a bleed flowpath 530 branching from the core flowpath 522 in the compressor section. The bleed flowpath may have branches for one or more functions. In the illustrated example, a metering valve 90 controls flow along the bleed flowpath. The metering valve may be controlled by the PTMS electronic controller 92 (FIG. 4). A key function of the bleed in passenger aircraft is for cabin/cockpit pressurization. Such a bleed or bleed branch may exit the cabin through relief valves and/or through unavoidable leakage.

The heat exchanger 70, along the bypass flowpath 524, has an upstream inlet 71 and a downstream inlet 72. Example heat exchanger 70 are tube bank heat exchangers or plate bank heat exchangers wherein the heat donor flow passes through the tubes or plates and the bypass flow passes around their exteriors.

In the example gas turbine engine, an upstream thermoelectric generator (TEG) 120 and a downstream TEG 121 are positioned with respective first sides 122 and 123 in heat exchange relation with the bypass flowpath. In the illustrated example, the TEG 120 and 121 may be mounted in the cowling 60. Similarly, the TEGs have second faces 124, 125 exposed to the external air flowpath 526 in heat exchange relation therewith. Thus, the TEGs may effectively be mounted in apertures extending radially through the cowling. Example TEGs may be formed as arrays of individual thermoelectric devices (TEDs) 130. FIG. 4 shows such TEDs electrically coupled in series though they may be physically positioned in parallel (e.g., having their respective faces engaging the same flows). Example physical arrangement is in a rectangular array with a given number of circumferential rows axial (upstream-to-downstream) columns in each array. The TEGs ae coupled via power management circuitry 150 to one or more electrical storage batteries 152. Example batteries are centrally located in the fuselage rather than locally mounted on the engine. Thus, the batteries may be shared by multiple engines. Similarly, at least a portion of the circuitry 150 may be central and shared; whereas, other portions (if any) may be local on the individual engines. The PTMS electronic controller 92 (discussed below—also shared) may be coupled for control by one or more control systems/subsystems (not shown) including local/engine-specific systems such as a FADEC (Full Authority Digital Engine Control) (in which case it likely would be engine-specific) and central/common/shared systems.

Additionally, alternative implementations may involve fuselage-integrated engine situations wherein one or more engines are mounted in respective engine bays of the fuselage rather than via pylons.

As noted above, the example first and second thermoelectric generators (TEG) 120, 121 are positioned with associated inboard 122, 123 sides along the bypass flowpath so as to be in thermal communication with the bypass airflow there along. The first and second TEGs have outboard sides 124, 125 positioned along the exterior/ambient flowpath 526 to be in thermal communication with air flowing outside the bypass flowpath. This example external airflow is wholly outside the engine and its nacelle in the illustrated example. In yet other variations (e.g., certain fuselage-mounted engine situations) the airflow in thermal communication with the outboard sides 124, 125 may be a second bypass airflow along a second bypass flowpath.

As is discussed below, the first TEG 120 is positioned upstream of the bypass heat exchanger along the bypass flowpath so that bypass flow passing across the inboard side 122 thereof then passes through the bypass heat exchanger 70. Similarly, the second TEG 121 is positioned downstream of the bypass heat exchanger along the bypass flowpath.

Because the bypass air has been partially compressed by the fan stage(s) it will be warmer than the ambient air. Also, the bypass flow may be radiantly or conductively heated by heat from the engine core. Accordingly, the temperature difference across the thermoelectric generators may be used to provide electric power.

The placement of the second TEG 121 downstream of the heat exchanger 70 will, in typical operating conditions, provide a greater $\Delta T$ across the second TEG than if the second TEG were not receiving air heated by the bypass heat exchanger. Thus, this allows a greater power generation by the second TEG than would otherwise occur (e.g., than if the second TEG were circumferentially clocked to a different sector that lacked the bypass heat exchanger).

Accordingly, in one mode of a group thereof, both TEGs may generate electricity while the bypass heat exchanger is cooling its second fluid flow (a segment of bleed flowpath 530 in the example). However, there may be circumstances under which the cooling provided by the bypass heat exchanger is inadequate. For example, this may involve an aircraft at cruise operations in which bypass duct temperatures are expected to be low, as measured by the TEGs. In this mode the TEGs will be configured to such that they are exclusively generating electrical power from bypass flow. Another scenario involves an aircraft at takeoff, or other extended low altitude operation, in which bypass duct temperatures are expected to be high, as measured by the TEGs. In such a situation, the first TEG 120 may be operated as a cooler consuming electricity to pre-cool the bypass air entering the bypass heat exchanger to, in turn, increase the cooling by the bypass heat exchanger of the second fluid. This will allow for low temperature air to be delivered to the aircraft to provide increased cooling when elevated ambient temperatures drive a higher cooling demand.

On an aircraft 700, the TEGs will be installed on engines 720A & 720B in an identical manner, however the functionality can be asymmetric between the engines. For example, in a cruise scenario, one engine (for example, 720A) may be biased in favor of providing engine bleed flow to the ECS system while the other engine (e.g., 720B) is biased for engine thrust performance and electrical power generation. In that scenario, the bleed-biased engine would have the first stage cooling the flow entering the heat exchanger 70 and the second stage potentially still generating electricity. The generation-biased engine would have both TEG stages generating electricity. The generation-biased engine may have its valve 90 closed or more tightly throttled than that of the bleed-biased engine so that net bleed for environmental use is entirely or mostly from the bleed biased engine (e.g., at least 75% of the mass airflow).

Each example TEG comprises a plurality of thermoelectric devices (TED) (e.g., Peltier-Seebeck Effect devices) 130 (FIG. 4). The TEDs of each TEG may be electrically wired in series but be thermally positioned in parallel such as in a tile grid extending circumferentially/transversely and axially/streamwise. FIG. 4 shows the grid upstream ends 140, 144, downstream ends 141, 145, first circumferential ends 142, 146, and second circumferential ends 143, 147. Each of the devices 130, itself, has an inboard face/surface 131 and an outboard face/surface 132. FIG. 1 also shows an engine-integrated generator 80. FIG. 1 shows the power management circuitry having connections 154 to such generator as well as to additional power sources (e.g., APU and RAT) and to loads.

Power for cooling via the first TEG may come from any of several sources. First, it may come from storage such as a battery. Second, it may come more directly from a generator on the engine and/or another engine of the aircraft. In a multi-engine aircraft, the engines may have different bypass heat exchanger cooling loads and may have different roles for respective generators. Thus, there may be asymmetries in operations of their TEGs (in embodiments that actually have TEGs on both engines of a twin-engine aircraft).

One example of a current baseline aircraft/engine configuration is the Airbus A320. In this aircraft, each engine has an integrated drive generator (IDG) for generating electricity. The two generators power respective AC buses which are interconnected to power the aircraft's electrical network. In a failure of one IDG, the failed IDG may be taken offline and the other may power all systems. Additionally, an auxiliary power unit (APU) and a ram air turbine (RAT) are capable of providing electrical power. Similarly, each engine has a compressor bleed which may be cross coupled.

As noted above, the generation of electricity will heat the cool side and warm the hot side of a TEG. This means generating electricity via the TEGs will cool the bypass flow and heat the external flow but at a lesser power. Further options involve actively cooling the bypass flow by using one or both TEGs as heat pumps wherein electrical power is used to extract a greater thermal power from the bypass flow than in the generator mode. Accordingly, in such active cooling mode, heating of the external flow is at a greater power. There may be certain conditions, particularly transient conditions, wherein such active cooling is beneficial. For example, a temporary high thrust condition might raise nozzle or other component temperatures above otherwise acceptable levels. Active cooling could mitigate this. Because this would increase heat delivered to the external flow, applicability may be highly limited and temporary to the extent that any continued heating of the external flow might cause problems of its own.

Additionally, as mentioned above, there may also be some applicability of active cooling in low thrust situations wherein the bypass flow might be insufficient to provide desired cooling in the heat exchanger. One possible implementation of that mode of operations under such condition involves running both TEGs as generators to allow a reduction in engine fuel consumption associated with a reduction in electrical generation from the conventional generators (and thereby potentially reducing the needed cooling load for the heat exchanger). However, in such a situation, the electrical generation may be fairly biased in favor of PTMS system performance.

Additionally, the voltage level provided by the TEGs can be utilized to provide feedback of the local temperature environment in which they are installed. This voltage feedback is interpreted by an PTMS electronic controller 92, located either on engine or on aircraft/shared, which can, in turn, command a control valve 90 to meter the compressor bleed flow to optimize PTMS performance by increasing flow when the TEG feedback indicates the local temperature environment of the bypass duct provides a more optimal environment for heat rejection. Similarly, the bleed flow can be reduced when bypass duct temperatures increase to the point where heat exchanger effectiveness is reduced.

FIG. 4 shows example connections 154 for a voltage feedback signal, proportional and characteristic of the local temperature of its installed environment, from the TEG. This signal is received by the PTMS electronic controller 92, which includes a calibrated signal converter 94 and integral controller hardware 96 that is operating PTMS system control logic. The signal from the TEG is converted to a temperature which then is passed to the PTMS control logic which sends an electronic signal to a metering valve 90 which throttles the bleed flow to the heat exchanger 70 according to bypass duct temperatures to optimize system performance.

Alternatively or additionally to PTMS control, the temperature feedback from the TEGs could similarly be routed to an engine control to quantify and optimize engine performance based on bypass duct temperatures.

Alternatively or additionally to the bleed, the heat exchanger can serve to cool fuel (e.g., for downstream use in a PTMS), lubrication oil (for gearbox or engine bearing lubrication), or a non-fuel/non-lubricant coolant (e.g., glycol-based) for other engine cooling loads (e.g., electronic control components) or aircraft cooling loads (e.g., avionics devices).

Figure 5:
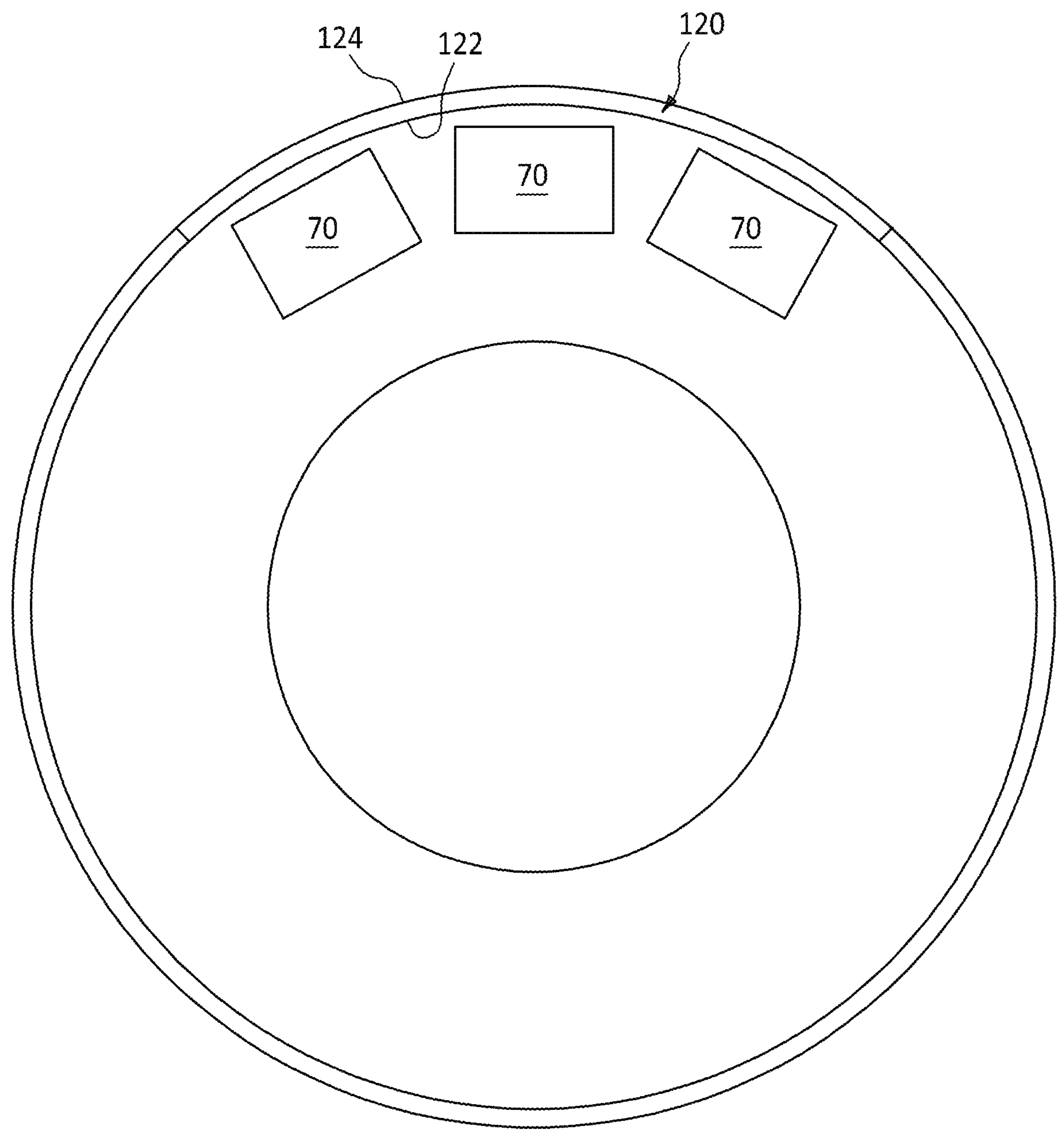
FIG. 5 is a schematic transverse sectional view of the engine.

FIG. 5 shows a further example wherein the TEGs occupy about a 90° sector. There are multiple heat exchangers 70 within that circumferential span.

Component materials and manufacture techniques and assembly techniques may be otherwise conventional.

One or more embodiments have been described. Nevertheless, it will be understood that various modifications may be made. For example, when applied to an existing baseline aircraft and/or engine configuration, details of such baseline may influence details of particular implementations. Accordingly, other embodiments are within the scope of the following claims.

What is claimed is:

1. A gas turbine engine comprising:

a core flowpath sequentially through one or more fan sections, one or more compressor sections, a combustor section, and one or more turbine sections;

a bypass flowpath extending through the one or more fan sections and bypassing the combuster section;

a heat exchanger in the bypass flowpath placing a portion of the bypass flowpath in heat exchange relation with a second fluid flowpath;

at least one first thermoelectric device having a first side upstream of the heat exchanger along the bypass flowpath and a second side away from the bypass flowpath; and at least one second thermoelectric device having a first side downstream of the heat exchanger along the bypass flowpath and a second side away from the bypass flowpath.

2. The gas turbine engine of claim 1 wherein:

the second fluid flowpath is a compressor bleed.

3. The gas turbine engine of claim 1 wherein:

the second fluid flowpath comprises one or more of:

a fuel flowpath fuel;

a lubricant flowpath; and a glycol-based coolant flowpath.

4. The gas turbine engine of claim 1 wherein:

the at least one first thermoelectric device is a plurality of first thermoelectric devices connected to form a first thermoelectric generator (TEG);

the at least one second thermoelectric device is a plurality of second thermoelectric devices connected to form a second thermoelectric generator (TEG);

the first thermoelectric generator and the second thermoelectric generator each have a first side and a second side; and the gas turbine engine is in an aircraft nacelle and the first thermoelectric generator and second thermoelectric generator second sides are exposed to an external airflow along an outside of the nacelle.

5. The gas turbine engine of claim 4 wherein:

the first thermoelectric generator comprises said first thermoelectric devices in a circumferential and streamwise array; and the second thermoelectric generator comprises said second thermoelectric devices in a circumferential and streamwise array.

6. An aircraft including the gas turbine engine of claim 1 and further comprising:

a storage battery.

7. The aircraft of claim 6 wherein:

the at least one first thermoelectric device and the at least one second thermoelectric device are coupled to the battery to allow charging of the battery.

8. The aircraft of claim 7 wherein:

the at least one first thermoelectric device and the at least one second thermoelectric device are coupled to the battery to allow powering by the battery.

9. A method for operating the aircraft of claim 6, the method comprising:

in a first mode, the at least one first thermoelectric device generating electricity and the at least one second thermoelectric device generating electricity; and in a second mode, the at least one first thermoelectric device actively cooling the bypass flow and the at least one second thermoelectric device generating electricity.

10. The method of claim 9 further comprising:

using one or more thermoelectric devices of the at least one first thermoelectric device and/or the at least one second thermoelectric device to measure temperature; and responsive to the temperature measurement, controlling flow along the second fluid flowpath.

11. The method of claim 9 wherein:
the gas turbine engine is a first gas turbine engine and the aircraft has a second gas turbine engine;
the second gas turbine engine also has:
a core flowpath sequentially through one or more fan sections, one or more compressor sections, a combustor section, and one or more turbine sections;
a bypass flowpath extending through the one or more fan sections and bypassing the combustor section;
a heat exchanger in the bypass flowpath placing a portion of the bypass flowpath in heat exchange relation with a second fluid flowpath;
at least one first thermoelectric device having a first side upstream of the heat exchanger along the bypass flowpath and a second side away from the bypass flowpath; and
at least one second thermoelectric device having a first side downstream of the heat exchanger along the bypass flowpath and a second side away from the bypass flowpath;
with the first gas turbine engine in its first mode, the second gas turbine engine at least one first thermoelectric device generating electricity and the second gas turbine engine at least one second thermoelectric device generating electricity; and
with the first gas turbine engine in its second mode, the second gas turbine engine at least one first thermoelectric device generating electricity and the second gas turbine engine at least one second thermoelectric device generating electricity.

12. The method of claim 11 wherein:
the first gas turbine engine is in its first mode and the second gas turbine engine at least one first thermoelectric device generating electricity and the second gas turbine engine at least one second thermoelectric device generating electricity during a cruise phase; and
the first gas turbine engine is in its second mode and the second gas turbine engine at least one first thermoelectric device generating electricity and the second gas turbine engine at least one second thermoelectric device generating electricity during a takeoff.

13. The method of claim 11 wherein:
with the first gas turbine engine in its second mode and the second gas turbine engine at least one first thermoelectric device generating electricity and the second gas turbine engine at least one second thermoelectric device generating electricity a bleed flow rate from the first gas turbine engine is greater than a bleed flow rate from the second gas turbine engine.

14. The method of claim 13 further comprising with the first gas turbine engine:
using one or more of the at least first thermoelectric device and/or the at least one second thermoelectric device to measure temperature; and
responsive to the temperature measurement, controlling flow along the second fluid flowpath.

15. A method for using the gas turbine engine of claim 1 comprising:
using one or more of the at least first thermoelectric device and/or the at least one second thermoelectric device to measure temperature; and
responsive to the temperature measurement, controlling flow along the second fluid flowpath.

16. A gas turbine engine comprising:
a core flowpath sequentially through one or more fan sections, one or more compressor sections, a combustor section, and one or more turbine sections;
a bypass flowpath extending through the one or more fan sections and bypassing the combustor section;
a heat exchanger in the bypass flowpath placing a portion of the bypass flowpath in heat exchange relation with a second fluid flowpath;
a first thermoelectric generator having a first side upstream of the heat exchanger along the bypass flowpath and a second side away from the bypass flowpath; and
a second thermoelectric generator having a first side downstream of the heat exchanger along the bypass flowpath and a second side away from the bypass flowpath.

17. A method for operating a gas turbine engine, the gas turbine engine comprising:
a core flowpath sequentially through one or more fan sections, one or more compressor sections, a combustor section, and one or more turbine sections;
a bypass flowpath extending through the one or more fan sections and bypassing the combustor section;
a heat exchanger in the bypass flowpath placing a portion of the bypass flowpath in heat exchange relation with a second fluid flowpath;
a first thermoelectric generator having a first side upstream of the heat exchanger along the bypass flowpath and a second side away from the bypass flowpath; and
a second thermoelectric generator having a first side downstream of the heat exchanger along the bypass flowpath and a second side away from the bypass flowpath,
the method comprising:
in a first mode, thermoelectrically generating electricity upstream of the heat exchanger while thermoelectrically generating electricity downstream of the heat exchanger along the bypass flowpath; and
in a second mode, thermoelectrically heating the bypass flow upstream of the heat exchanger while thermoelectrically generating electricity downstream of the heat exchanger along the bypass flowpath.

18. The method of claim 17 further comprising:
in a third mode, thermoelectrically cooling the bypass flow downstream of the heat exchanger along the bypass flowpath.

19. The method of claim 17 further comprising:
in a third mode, thermoelectrically cooling the bypass flow upstream of the heat exchanger while thermoelectrically cooling the bypass flow downstream of the heat exchanger along the bypass flowpath.

* * * * *